United States Patent [19]

Quick

[11] Patent Number: 4,879,830
[45] Date of Patent: Nov. 14, 1989

[54] TRAWL DOOR

[76] Inventor: Freddie W. Quick, 2001 Fulton St. P.O. Box 8125, Southport, Fla. 32409

[21] Appl. No.: 285,621

[22] Filed: Dec. 16, 1988

[51] Int. Cl.$^4$ ............................................. A01K 73/045
[52] U.S. Cl. ......................................................... 43/9.7
[58] Field of Search ............................................... 43/9

[56] References Cited

U.S. PATENT DOCUMENTS

| | | | |
|---|---|---|---|
| 2,942,371 | 6/1960 | Johnson | 43/9 |
| 3,410,014 | 11/1968 | Jenssen | 43/9 |
| 4,045,901 | 9/1977 | Prudenzi | 43/9 |
| 4,640,037 | 2/1987 | Ashworth | 43/9 |

FOREIGN PATENT DOCUMENTS

| | | | |
|---|---|---|---|
| 611649 | 1/1961 | Canada | 43/9 |
| 508039 | 9/1930 | Fed. Rep. of Germany | 43/9 |
| 35487 | 5/1935 | Netherlands | 43/9 |
| 120989 | 12/1958 | U.S.S.R. | 43/9 |

Primary Examiner—Gene P. Crosby
Attorney, Agent, or Firm—Donald J. Breh

[57] ABSTRACT

A trawl door is disclosed including a V-shaped member having two louvers and a three point tow cable attachment system. One louver is located on each side of the central longitudinal axis and includes a slat extending into an obtuse included angle of the V-shaped member. The tow cable attachment system includes one link attached proximate outside leading edge corners of the V-shaped member and a second link extends from a point on the central longitudinal axis proximate the trailing edge of the V-shaped member and attaches at a plurality of locations along the length of the first link. The attachment locations defining different tow cable attachment points.

20 Claims, 2 Drawing Sheets

TRAWL DOOR

BACKGROUND OF THE INVENTION

This invention relates to trawl doors, also known as trawl boards. Trawl doors are devices used in the fishing industry to pull and spread a fishing net while being towed by a vessel. In use, a net is attached to each of two trawl doors which are in turn each connected to a tow cable arrangement attached to the vessel. When towed, the trawl doors keep the mouth of the net spread open. Typically, trawl doors are shear members made either of wood or metal and are designed to exert a desired spreading force when pulled through the water. Present trawl doors, and in particular wood trawl doors, have considerable natural weight or require the addition of ballast to make them assume a desired depth in the water when towed. These heavy or weighted doors contribute to increased power requirements and fuel consumption of the towing vessel which is of course undesirable. Accordingly, it is desirable that the depth of operation be adjustable without having to add or remove ballast. Further, it is also desirable that the lateral or spreading force exerted by the trawl door on the net be easily adjustable with minimum effect on drag.

One known trawl door is disclosed in U.S. Pat. No. 3,410,014. That trawl door includes two V-shaped partially overlaping shear members joined along their edges and having their concave sides facing each other. An angularly adjustable elevator is mounted in the passageway formed between the two shear members to control the depth of operation. While this trawl door has less drag in the water and thus effects a decrease in power and fuel consumption of the towing vessel and does provide for controlling the depth of operation, there is no means for controlling the lateral net spreading force generated by the door. Further, although the two shear member construction does reduce weight of the door over solid wood doors, the door still has considerable weight and drag in the water and further improvement is desirable.

SUMMARY OF THE INVENTION

Accordingly, it is an object of the present invention to provide for an improved trawl door having reduced power consumption requirements over presently available trawl doors without compromising net spreading power of the trawl door.

It is another object of the invention to provide for a trawl door for which both the depth of operation and spreading force developed by the trawl door is easily adjusted.

According to the invention, the trawl door includes a single rectangular aluminum sheet formed into a V-shaped member having an obtuse included angle about a central longitudinal axis and a pair of louvers, one on each side of the central longitudinal axis opening into the space defined by the obtuse included angle and means for attaching a net tow cable and a trawl door tow cable to the V-shaped member.

According to an important feature of the invention, the means for attaching the trawl door tow cable includes a three point attachment system including two links, one disposed transversely across the central longitudinal axis proximate the leading edge of the V-shaped member and a second link extending from a location on the central longitudinal axis proximate the trailing edge of the V-shaped member to a position on the first link. The attachment position of the second link to the first link defines the attachment point of the trawl door tow cable.

According to an important feature of the invention, the first link is orientated perpendicular to the V-shaped member when the trawl is towed and the attachment of the second link to the first link is adjustable to a plurality of different positions along the length of the first link. Advantageously the position of the tow cable attachment point along the length of the first link determines the dive and rise characteristics of the trawl door.

According to another important feature of the invention, the means for attaching the net tow cable includes a bracket at opposite outside trailing edge corners of the V-shaped member.

A further important feature of the invention provides for the width of the rectangular V-shaped member to be two thirds the length of the member and the obtuse included angle to be about 147 degrees.

A still further important feature of the invention provides for the trailing edge of each louver to be located from the leading edge of the V-shaped member a distance not greater than one third the length of the V-shaped member and preferably at about one quarter the length of the V-shaped member.

BRIEF DESCRIPTION OF THE DRAWINGS

The invention will be better understood after reading the following Detailed Description of a Preferred Embodiment in conjunction with the Drawings in which.

DETAILED DESCRIPTION OF THE PREFERRED EMBODIMENT

Figure 1:
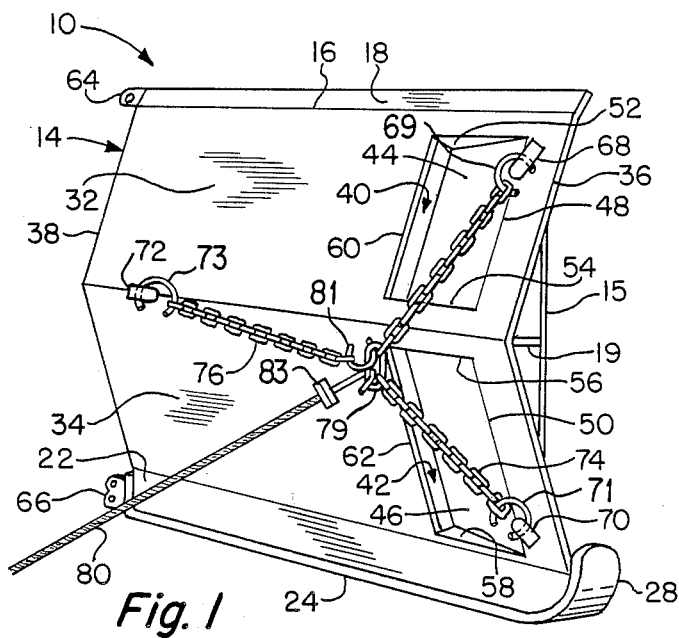
FIG. 1 is a perspective view of a trawl door according to the invention.
Figure 5:
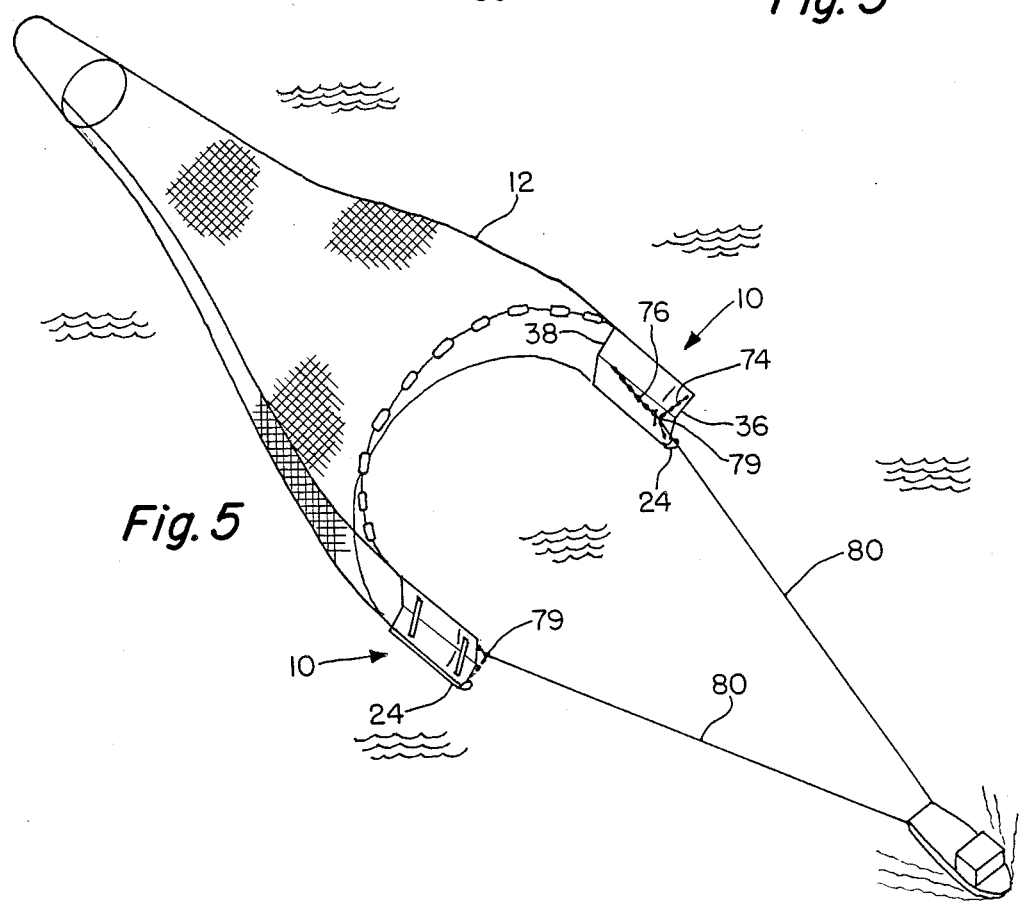
FIG. 5 is a pictoral view of a system showing a pair of trawl doors according to the invention in operation pulling a fishing net.

Shown in FIG. 1 is a trawl door 10 for use in a fishing system such as that shown in FIG. 5 for towing a fishing net 12. In use, trawl doors are used in pairs and are towed by a vessel to maintain the mouth of the net 12 spread. The trawl doors 10 exerts a lateral or spreading force when towed to keep the mouth of net spread apart and depending on what the fisherman is fishing for the depth that the net must be maintained at is set accordingly. The trawl door accordingly is required to either dive deeper or to rise.

The trawl door according to the present invention provides for adjusting the spreading force on the net as well as providing for easily controlling the depth at which the trawl door will operate.

According to the invention, the trawl door is a rectangular sheet of preferably a high grade marine aluminum formed into a V-shaped member 14 having an obtuse included angle A about a central longitudinal axis. While doors of different sizes are contemplated depending on the application, it has been found empirically that, regardless of the overall size of the door, the width of the V-shaped member, which is also the height of the member in operation, should be about ⅜ the length (L) with the included angle A being preferably about 147 degrees. For larger sized doors, for example doors greater than 4 feet in length, the V-shaped member is provided with a longitudinal bend 16 forming a small width longitudinal flange 18 along the top, as viewed in operation, longitudinal edge of the V-shaped member to add rigidity to the member. Small doors, less than 4 feet in length, do not require the strengthening flange 18.

Figure 4:
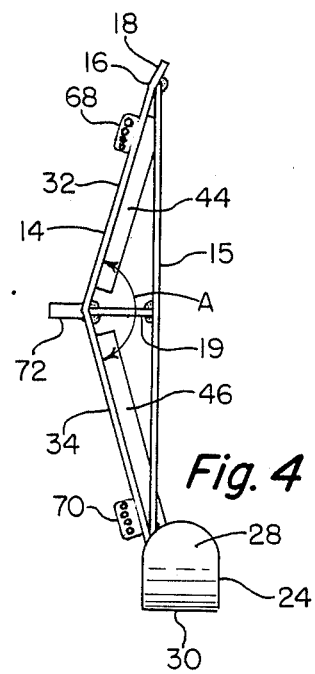
FIG. 4 is an end view of the trawl door in FIG. 1 toward the leading edge of the door showing further details of construction.
Figure 3:
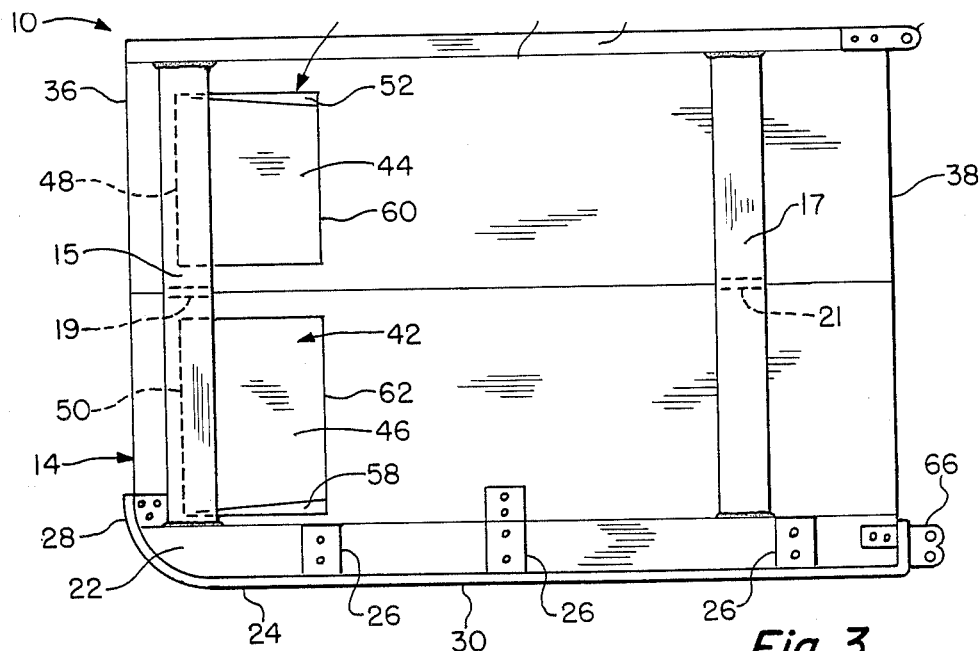
FIG. 3 is a side elevational view of the trawl door in FIG. 1 toward the concave side of the door showing details of construction.

As best shown in FIGS. 3 and 4 a pair of longitudinally spaced apart transverse braces 15, 17 extend between opposite sides of the V-shaped member and are secured to longitudinal gussets or braces 19, 21 affixed to the member on the longitudinal axis for adding further rigidity to the member. On very large trawl doors additional bracing can be added as required.

At the bottom longitudinal edge, also as viewed in operation, the V-shaped member is provided with a reverse bend to form a longitudinal flange 22 to which a steel shoe 24 is fastened. The shoe 24 is bolted to the flange 22 by way of a plurality of brackets, such as 26, and is provided with a rolled, up-turned, ski-like leading portion 28 and a flat bottom 30. In operation, the shoe bottom 30 is able to contact and run flat on the sea bottom with the V-shaped member extending vertically above the shoe in the water as shown in FIG. 5.

The V-shaped member includes two rectangular flat faced portions 32, 34 one on each side of the central longitudinal axis extending between a leading edge 36 and a trailing edge 38 of the member. Each rectangular flat faced portion 32, 34 is provided with a rectangular louver 40, 42 respectively. Each louver 40, 42 includes a slat 44, 46 extending from a respective louver leading edge or slat bend line 48, 50 into the space between the flat faced rectangular portions defined by the obtuse included angle A. Each louver is closed on its opposite edges by triangular shaped members 52, 54, and 56, 58 respectively. Preferably, each slat 44, 46 is angled at about 35 degrees relative to the plane of the respective flat faced rectangular portion in which it is provided. The louvers primarily effect the lateral or spreading force developed by the door and it has been found that the trailing edges 60, 62 of each louver should be located a distance from the leading edge 36 of the V-shaped member not exceeding one third the length L of the V-shaped member and preferably at one quarter the length L. Further, the leading edges of the louvers or bend lines 48, 50 of each slat should preferably be located at a distance from the leading edge 36 of the V-shaped member equal to one sixteenth the length L of the V-shaped member.

The outside trailing edge corners of the V-shaped member are provided with net attachment members in form of lugs 64, 66 for attaching appropriate net tow cables to the trawl door, as shown in FIG. 5.

Figure 2:
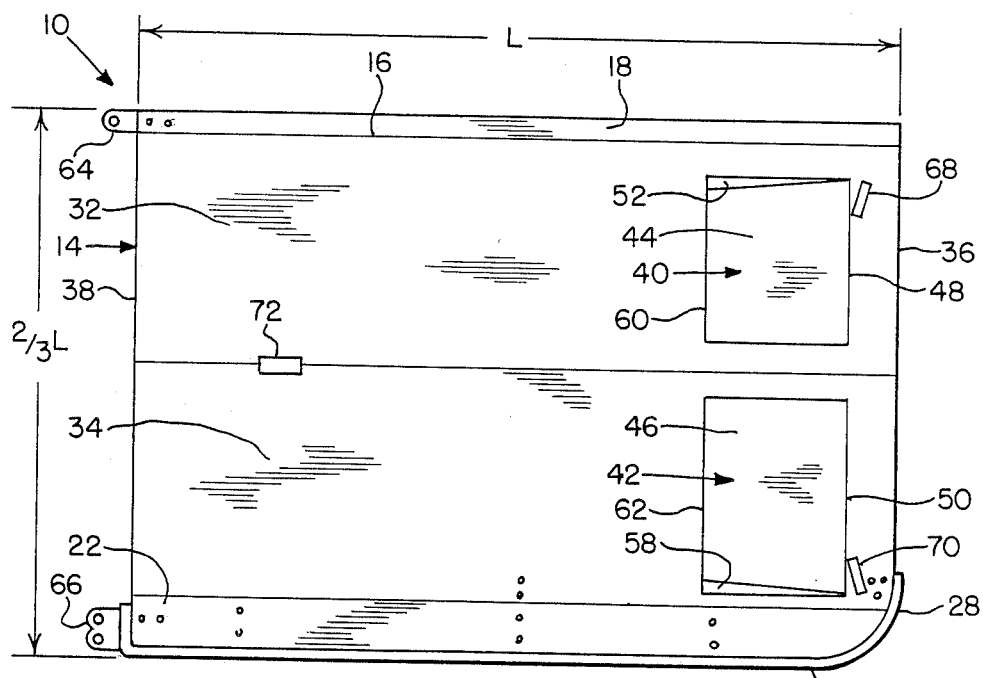
FIG. 2 is a side elevational view of the trawl door in FIG. 1 toward the convex side of the door showing details of construction.

A trawl door tow cable attachment system is provided which not only provides means to tow the trawl door but also provides for controlling the net spreading power created by the door and the dive and rise characteristics of the door. The trawl door tow cable attachment system: includes two first link attachment members 68, 70 one provided proximate each outside leading edge corner of the flat faced portions on the convex side of the V-shaped member, as shown in FIGS. 1 and 2. A second link attachment member 72 is located on the central longitudinal axis of the member proximate the trailing edge 38. All three link attachment members are provided with holes, or other means readily devisable, for securing a first link 74 between the first link attachment members 68, 70 and a second link 76 to the second link attachment member 72 with, for example, conventional attachment hardware such as split rings 69, 71, 73. The second link 76 is adjustable in length and removably attachable to the first link 74 at a plurality of locations intermediate the first link attachment members 68, 70 also by conventional hardware well known to seamen and those skilled in the art of trawl door operation including, for example, the split ring 81 which attachment location defines the attachment point 79 of the trawl door tow cable 80. Preferably the links 74, 76 are strong, flexible members such as chains or steel cables.

By way of background, the attachment location 79 of the second link 76 to the first link 74 effects the dive and rise characteristics of the trawl door. At attachment locations above the central longitudinal axis, that is closer to the upper first link attachment member 68, the towing point 79 is raised and the trawl door will rise in the water, whereas when the attachment point 79 is lowered on the first link, that is closer to attachment member 70, the towing point 78 is lowered and the trawl door will dive deeper. Further, by changing the length of the second link 76 between the tow point 79 and the second link attachment member 72, the spreading power of the door is effected. Decreasing the length will increase the spreading force created by the trawl door and increasing the length of the second link will decrease the spreading force.

The trawl door tow cable attachment system is preferably, at least initially, adjusted as follows. The first link 74 is pulled taut in a V and held perpendicular to the flat faced portions 32, 34. With the first link held perpendicular to the flat faced surfaces of the door, the second link 76, which is connected to the second link attachment member 72, is pull taut against the second attachment member 72, and connected to the midpoint of the first link 74. Preferably the connection 79 to the first link is by way of a standard swivel 83 providing for easy attachment of the tow cable from the vessel at the junction of the two links. As noted above, the trawl door can be made to rise or dive by repositioning the attachment 79 of the second link to different locations along the first link while preferably maintaining the first link perpendicular to the faces 32, 34 of the door through adjustment of the length of the second link as required.

Also, the spreading power of the door can be changed as noted above by increasing or decreasing the length of the second link.

As shown in FIG. 5, the trawl doors are used in pairs where each is a mirror image of the other. It is particularly important that the trawl doors of any pair to be used together be made as dimensionally the same as possible since it has been found that the operational characteristics are particularly sensitive to changes in adjustments to the tow cable attachment system chains. Accordingly, particular attention to locating the chain attachments at the same locations on each of the trawl doors should be made.

After adjusting the tow cable attachment system and attaching the trawl door tow cables 80 to each door at the attachment point 79, appropriate net tow cables are attached to the trailing corner attachments of each trawl door.

It has been found that trawl doors according to the invention provide reduced drag and fuel consumption, effective net spreading and the ability to more easily control the depth of fishing.

Having described the preferred embodiment of the invention those skilled in the art having the benefit of the description can readily devise other embodiments and modifications and such other embodiments and modifications are to be considered to be within the scope of the appended claims.

What is claimed is:

1. A trawl door comprising:
   a rectangular sheet-like V-shaped member having an obtuse included angle about a central longitudinal axis forming two flat-faced portions on opposite sides of said central longitudinal axis, said member including a pair of louvers, one louver in each flat faced portion, each louver including a slat extending from a leading edge of each louver into a space between said opposite sides of said member within said obtuse included angle;
   means for attaching a net tow cable arrangement to said member; and
   means for attaching a trawl door tow cable arrangement to said member.

2. The trawl door as defined in claim 1 wherein said means for attaching said trawl door tow cable arrangement comprises a three point cable attachment system including two link attachment members, one proximate an outside leading edge corner of each flat faced portion of said V-shaped member, a third link attachment member on the central longitudinal axis proximate a trailing edge of said rectangular sheet-like V-shaped member;
   a first link connected between said two link attachment members; and
   a second link connected to said third link attachment member and to said first link at a location along the length of said first link intermediate said two link attachment members, said location of the attachment of said second link to said first link defining a trawl door tow cable attachment point.

3. The trawl door as defined in claim 2 wherein the attachment of said second link to said first link is adjustable to a plurality of different intermediate locations along the length of said first link.

4. The trawl door as defined in claim 2 wherein the length of said second link between the attachment to said first link and to the third attachment member is adjustable.

5. The trawl door as defined in claim 3 wherein the length of said second link between the attachment to said first link and the third attachment member is adjustable.

6. The trawl door as defined in claim 5 wherein said first link lies in a plane substantially perpendicular to said two flat faced portions of said V-shaped member.

7. The trawl door as defined in claim 5 wherein said first and second links are elongated flexible members.

8. The trawl door as defined in claim 5 wherein said means for attaching a net tow cable arrangement includes two net tow cable attachment members, one proximate an outside trailing edge corner of each of said flat faced portions of said V-shaped member.

9. The trawl door as defined in claim 1 wherein a trailing edge of each louver is located at a distance from the leading edge of the flat faced portion in which it is provided about one quarter the length of said rectangular V-shaped member.

10. The trawl door as defined in claim 9 wherein the leading edge of each louver is located at a distance from: the leading edge of the flat faced portion in which it is provided about one sixteenth the length of said rectangular V-shaped member.

11. The trawl door as defined in claim 10 wherein the width of said rectangular V-shaped member is about two thirds the length of said rectangular V-shaped member.

12. The trawl door as defined in claim 11 wherein the obtuse included angle is about 147 degrees.

13. A trawl door comprising:
   A rectangular sheet-like member formed into a V-shaped member having an obtuse included angle about a central longitudinal axis defining a pair of rectangular flat faced portions on opposite sides of said central longitudinal axis, said V-shaped member having a leading edge and a trailing edge, each of said flat faced portions including a louver having a leading edge, the leading edge of each of said louvers being proximate and equidistance from the leading edge of said V-shaped member;
   two net tow cable attachment members proximate the trailing edge of said V-shaped member, one proximate an outside corner of each of said rectangular flat faced portions proximate said trailing edge; and
   means for connecting a trawl door tow cable to said V-shaped member including two link attachment members one disposed proximate an outside corner of each rectangular portion proximate said leading edge of said V-shaped member and a third link attachment member disposed on the central longitudinal axis at a location intermediate said leading edge and said trailing edge of said V-shaped member, a first link connected between said two link attachment members and a second link connected to said third link attachment member and to said first link at a location along the length of said first link intermediate said two link attachment members, the attachment location of said second link to said first link defining a trawl door tow cable attachment point.

14. The trawl door as defined in claim 13 wherein said second link is removably attachable to said first link at a plurality of intermediate locations along the length of said first link between the two link attachment members.

15. The trawl door as defined in claim 13 wherein said second link is adjustable in length.

16. The trawl door as defined in claim 13 wherein said second link is removably attachable to said first link at a plurality of intermediate locations along the length of said first link between the two link attachment members and the second link is adjustable in length.

17. The trawl door as defined in 16 wherein said first link lies in a plane substantially perpendicular to the rectangular flat faced portions.

18. The trawl door as defined in claim 17 wherein said first link and said second link are flexible chain-like members.

19. A trawl door comprising:
   a sheet-like V-shaped member having two rectangular flat-faced portions separated by an obtuse included angle about a central longitudinal axis, said V-shaped member having a leading edge and a trailing edge, each of said rectangular portions including a louver proximate the leading edge of said V-shaped member, each louver including a slat extending from a leading edge of said louver into a space between said flat faced portions within said obtuse included angle;

means for attaching a net tow cable to the V-shaped member; and means for attaching a trawl door tow cable including two attachment members proximate the leading edge of said V-shaped member, one of said two attachment members proximate an outside corner of each of said rectangular flat-faced portions proximate said leading edge of said V-shaped member, a third attachment member disposed on the central longitudinal axis proximate the trailing edge of said V-shaped member, a first link connected between said two attachment members, said first link orientated substantially perpendicular to said flat faced portions when said V-shaped member is towed by a trawl door tow cable and a second link connected to said third attachment member and to said first link at a location intermediate said two attachment members, said location defining an attachment point for said trawl door tow cable.

20. The trawl door as defined in claim 19 wherein a trailing edge of each louver is located from the leading edge of said V-shaped member a distance not greater than one third the length of said V-shaped member.

* * * * *